United States Patent

Labossier et al.

[11] 3,853,582
[45] Dec. 10, 1974

[54] METALLIZED ISOTROPIC BORON NITRIDE BODY AND METHOD FOR MAKING SAME

[75] Inventors: William H. Labossier, Billerica; Hartmut Schilling, Watertown, both of Mass.

[73] Assignee: Raytheon Company, Lexington, Mass.

[22] Filed: Jan. 13, 1972

[21] Appl. No.: 217,656

Related U.S. Application Data

[63] Continuation of Ser. No. 8,053, Feb. 2, 1970, abandoned.

[52] U.S. Cl.............. 117/22, 75/208, 117/31, 117/61, 117/160 R, 117/169 R
[51] Int. Cl.............................. B44d 1/00
[58] Field of Search............ 117/22, 31, 121, 160 R, 117/169 R, 221, 227, 46 CA, 46 FA, 61; 75/212, 208

[56] References Cited
UNITED STATES PATENTS

| | | | |
|---|---|---|---|
| 2,351,798 | 6/1944 | Alexander | 29/494 |
| 2,570,248 | 10/1951 | Kelly | 29/179.5 |
| 2,857,663 | 10/1958 | Beggs | 29/494 |
| 3,181,947 | 5/1965 | Vordahl | 75/206 |
| 3,399,076 | 8/1968 | Ginsberg et al. | 117/121 |
| 3,410,714 | 11/1968 | Jones | 117/22 X |
| 3,446,643 | 5/1969 | Karlak | 117/22 |
| 3,502,493 | 3/1970 | Forestek | 117/22 |
| 3,515,574 | 6/1970 | Montgomery | 117/71 |
| 3,620,799 | 11/1971 | Hoelscher | 117/22 |

FOREIGN PATENTS OR APPLICATIONS

| | | | |
|---|---|---|---|
| 652,948 | 11/1962 | Canada | 117/22 |

OTHER PUBLICATIONS

Naidich, Yu. V. et al., "Contact Interaction and Wetting Hexagonal and Cubic Boron Nitride by Molten Metals," 1968, Chem. Abstracts, Vol. 71, 94211k, 1969.

Kurtz, et al., "Vacuum Coating of Boron Nitride," 1969, Chem. Abstracts, Vol. 71, 94105d, 1969.

*Primary Examiner*—William D. Martin
*Assistant Examiner*—Shrive P. Beck
*Attorney, Agent, or Firm*—Joseph D. Pannone; Milton D. Bartlett

[57] ABSTRACT

An isotropic boron nitride body is metallized with an alloy or intimate mixture formed from an active metal dissolved in a solder metal, which solder metal possesses a substantially lower melting point than the active metal hydride. The molybdenum is selectively added for increasing craze resistance.

3 Claims, No Drawings

METALLIZED ISOTROPIC BORON NITRIDE BODY AND METHOD FOR MAKING SAME

This is a continuation of application Ser. No. 8,053, filed Feb. 2, 1970, now abandoned.

BACKGROUND OF THE INVENTION

This invention relates to the metallizing of a non-metallic refractory body, and more particularly, for metallizing the body suitable for bonding to a refractory metal.

In order to bond one refractory to another, it is necessary to form a transition zone having the requisite mechanical strength and the capability of wetting the materials to be joined. It is known from U.S. Pat. No. 2,570,248 to F. C. Kelley, issued on Oct. 9, 1951, that a number of non-metallic refractories can be metallized, i.e., "wetted", if a composition of titanium hydride and a solder metal was applied to the surface of interest and heated, preferably in a pure dry atmosphere.

Of the important and contemporary new non-metallic refractory materials, isotropic boron nitride stands out as a desirably bondable material. In this regard, reference should be made to co-pending application Ser. No. 582,686, filed on Sept. 28, 1966, in the name of James Pappis et al., relating to isotropic boron nitride, now abandoned.

As may be recalled, boron nitride is notoriously non-reactive to most metals. This means that it is difficult to wet or metallize. Furthermore, with regard to the Kelly reference, boron nitride will not metallize in a hydrogen atmosphere.

It is, accordingly, an object of this invention to devise an alloy or intimate mixture capable of wetting or metallizing the surface of a non-metallic refractory such as isotropic boron nitride.

It is, accordingly, another object of this invention to devise an alloy for metallizing a non-metallic refractory such as isotropic boron nitride and a method for making same, which permits the formation of a sufficiently thick layer having sufficient requisite mechanical strength. Relatedly, it is desired that the amount of layer penetration of the alloying composition be controllable to a high degree of accuracy.

Reference may be made to U.S. Pat. No. 3,344,505, issued to C. M. Rively et al., on Oct. 3, 1967. Rively describes a method of bonding a boron nitride body to a refractory metal by placing a thin aluminum spacer between the refractory metal and the boron nitride containing body and melting the aluminum in a non-reactive atmosphere to form a bond. This reference does not treat the special problems of an isotropic non-metallic refractory material. Unfortunately, aluminum is so active that it attacks not only the boron nitride body but the other refractory metal so that the ability to control the degree and quality of the bond is rendered very difficult. Moreover, attention must also be given to the fact that aluminum forms a brittle alloy with most bonding materials and, consequently, is very susceptible to mechanical failure.

SUMMARY

The foregoing objects are satisfied by a composition consisting of an alloy or intimate mixture of an active metal dissolved in a solder metal. The solder metal has a lower melting temperature than the active metal. This composition metallizes the surface of an isotropic boron nitride body. It is made substantially craze resistant through the addition of molybdenum (or other suitable refractory metal such as tungsten, tantalum, or $ZrB_2$).

The active metal is preferably selected from at least one of the group consisting of zirconium, titanium, and hafnium. The solder metal is also preferably selected from at least one of the group consisting of nickel, platinum, copper, gold and silver. The optimum strength and craze resistance was found to exist when the alloy consisted essentially of from about 1 to about 17% by weight of nickel, and from about 5 to about 12% by weight of molybdenum, the remainder of the alloy consisting of an active metal.

The method for making the alloy comprises the steps of vaporizing surface contaminants of the isotropic boron nitride body, wetting the cleaned BN surface with a powdered composition, and sintering the wetted BN surface in a non-reactive atmosphere within a temperature range from about 1000°C to about 1500°C. The powdered composition includes as active metal hydride and a solder metal. For craze resistance, the powdered composition includes measurable amounts of molybdenum.

Active metal hydrides are used to avoid active metal combination with oxygen and because the hydride is a reducing agent which is easily dissociated at high temperatures. This latter effect could not be easily accomplished with the active metals alone or their oxygen compounds.

DESCRIPTION OF THE PREFERRED EMBODIMENT

It was unexpectedly discovered that if small amounts of a solder metal such as copper, silver, and nickel were used to dissolve an active metal, and if this composition were placed in contact with an isotropic BN body, "sticking" or wetting occurred. It was further discovered that as the amount of solder metal was proportionately reduced, the "stickiness" was also reduced. Furthermore, it was found that as the amount of solder metal was increased, then excessive cracking or crazing of the resulting metallized surface occurred.

These problems were solved through the formation of a porous mass that resisted cracking. Thus, is a 1 to 20% by weight low melting solder metal including nickel or copper was used, then the resulting mass would resist crazing or cracking. However, the temperature range of the "stickiness" is very small. In this context, it was discovered that the addition of molybdenum would broaden the temperature range of interest. It may be observed, by way of analogy, that the molybdenum is this alloy acts as gravel in a concrete mix. Thus, molybdenum gives a reinforcing strength, thereby increasing the temperature range within which the alloy resists cracking or crazing.

Turning our attention to the problem of metalllizing isotropic boron nitride, it was found desirable to first vacuum fire and then dessicate the isotropic BN body in order to vaporize surface contaminants. There exists a thin layer of a corrosion product on boron nitride when it is exposed to air. If the corrosion product is not removed, then poor sticking results. It has been found that the principal contaminant is boron oxide ($B_2O_3$). This has a vaporization temperature in a good vacuum of about 1200°C. In one fabrication run, for instance, the vacuum fired BN body was brushed with a mixture of 12% nickel by weight and zirconium hydride in an amylacetate suspension. The sample was inserted into an alumina tube mounted on an ion pump system. The tube and sample were pumped overnight to a pressure of $2\times10^{-7}$ torr (ion gauge). The temperature was raised slowly to maintain a pressure of less than $2\times10^{-5}$ torr. The gas pressure increased at about 450°C due probably to the binder (amylacetate) of the metallizing mixture. At 600°C a gettering action was noted by a sudden drop in pressure to $5\times10^{-6}$ torr. The pressure remained the same at 900°C. The sample was kept more or less at a constant pressure of $7\times10^{-6}$ torr while the mixture was sintered at between 1150°C to 1200°C for over two hours.

The boron nitride sample was extracted and visually and mechanically examined. First, the sample was scratch tested with the result that only small amounts of metallizing composition were removed. Adhesion of the metallizing composition was demonstrated by applying a gummed transparent tape to the metallized surface. The composition did not peel away. Furthermore, the metallizing surface exhibited less than one ohm resistance when subjected to an applied electrical resistance test. The sample was plated with only one mil thickness of nickel. The nickel plating neither peeled nor flaked away and was uniform throughout. Lastly, the sample was brazed in a vacuum furnace to a piece of 10 mil thick copper foil. The foil was removed by peeling. The boron nitride stuck to portions of the foil, indicating that the bond was stronger than the BN.

In another test, a mixture of zirconium hydride, nickel, and molybdenum powders having an average particle size of less than six micrometers was applied as a coating to the boron nitride surface and sintered at a suitable temperature. As previously described, it was observed that craze resistance could be increased through the addition of molybdenum. The optimum composition comprises 1 to 17% nickel by weight with 5 to 12 percent molybdenum, the remainder of the composition being an active metal hydride such as zirconium, titanium, and hafnium. Best results were found when the composition was sintered between 5 minutes to 4 hours at a temperature between 1050°C and 1400°C in a good vacuum or non-reactive atmosphere. Especially good results were found after 4 hours of sintering at 1130°C. The metallizing mixtures containing nickel and zirconium tend to craze as a result of the different thermal coefficients of expansion of the mixture and the boron nitride. The addition of molybdenum powder minimizes this mismatch.

Generally, the method for metallizing the isotropic BN body consists of the steps of vaporizing the surface contaminants on the BN body, wetting the BN body with the powdered metallizing composition, and sintering the wetted surface in a non-reactive atmosphere. The powdered composition included an active metal hydride and a solder metal, with the solder metal having a substantially lower melting temperature than the metal of the hydride. Thus, broadly, it was found that if one or more hydrides or zirconium, titanium, and hafnium were mixed with one or more solder metals of nickel, platinum, copper, gold, or silver, they would wet the BN body and further were sinterable to form an adhering surface. The sintering action would decompose the active metal from the hydrogen. The hydrogen would either vaporize or combine with any residual oxygen in the atmosphere. As previously reported, measurable amounts of molybdenum substantially increase the craze resistance. It was further found that the method would be operable from vacuum conditions up to conditions of several hundred torr of non-reactive atmosphere pressure.

It will be recognized that the objects of the invention have been achieved by providing a method for fabricating an alloy that will metallize with isotropic boron nitride. While the best embodiments of the invention have been illustrated and described in detail, it is to be particularly understood that the invention is not limited thereto or thereby.

What is claimed is:

1. A method for metallizing the surface of an isotropic boron nitride body comprising the steps of:
   removing the surface contaminants from the boron nitride body by vaporizing said contaminants;
   coating a surface of the clean boron nitride body with a composition comprising powders selected from at least one of the group consisting of zirconium hydride, titanium hydride, and hafnium hydride; five to twelve percent by weight of molybdenum powder; and the powders selected from at least one of the group consisting of nickel, platinum, copper, gold, and silver; and
   heating said body in a non-reactive atmosphere within a temperature range from about 1000°C to about 1500°C.

2. The method according to claim 1 wherein the step of coating a surface of the clean boron nitride body with a composition includes in said composition one to seventeen percent by weight of nickel.

3. The method according to claim 1 wherein the step of coating a surface of the clean boron nitride body with a composition includes in said composition nickel and zirconium.

* * * * *